United States Patent
Keith, Jr.

[11] Patent Number: 5,970,917
[45] Date of Patent: Oct. 26, 1999

[54] MARINE AQUACULTURE APPARATUS

[76] Inventor: Richard W. Keith, Jr., 3 Meco Cir., Wilmington, Del. 19805

[21] Appl. No.: 09/030,623

[22] Filed: Feb. 27, 1998

[51] Int. Cl.[6] ................................................ A01K 63/00
[52] U.S. Cl. .............................................. 119/223
[58] Field of Search ................................. 119/200, 223, 119/204, 205, 207, 208, 215, 217, 238, 234, 239

[56] References Cited

U.S. PATENT DOCUMENTS

| | | | |
|---|---|---|---|
| 3,240,186 | 3/1966 | Dobell | 119/223 |
| 3,691,994 | 9/1972 | McPherson | 119/223 |
| 3,870,018 | 3/1975 | Fruchtnicht . | |
| 4,147,130 | 4/1979 | Goguel | 119/223 |
| 4,189,379 | 2/1980 | Finley | 119/3 |
| 4,244,323 | 1/1981 | Morimura . | |
| 4,257,350 | 3/1981 | Streichenberger . | |
| 4,312,296 | 1/1982 | Stelleman et al. . | |
| 5,172,649 | 12/1992 | Bourgeois | 119/223 |
| 5,299,530 | 4/1994 | Mukadam et al. | 119/223 |
| 5,359,962 | 11/1994 | Loverich . | |
| 5,549,076 | 8/1996 | Kaarstad . | |
| 5,628,279 | 5/1997 | Bones, IV | 119/215 |

*Primary Examiner*—Thomas Price
*Attorney, Agent, or Firm*—Connolly & Hutz

[57] ABSTRACT

Marine aquaculture apparatus comprises a submersible torus-shaped enclosure having perforations therein. Structure is provided for raising the torus-shaped enclosure to the surface of a body of water and lowering the enclosure into the body of water. An access door on the torus-shaped enclosure provides entry into interior portions thereof. These interior portions of the enclosure function as a habitat for growing marine life such as fish. Preferably the torus-shaped enclosure comprises a perforated surface generated by the revolution of a circle about a vertical axis.

11 Claims, 2 Drawing Sheets

MARINE AQUACULTURE APPARATUS

BACKGROUND OF THE INVENTION

The present invention relates to apparatus for practicing marine aquaculture, and more particularly to a submersible enclosure for raising and maintaining a wide variety of marine life such as fish.

Aquaculture is part of a growing trend in the United States and elsewhere to grow fish for the purposes of restocking and replenishing dwindling fish species, and also for the purposes of food. Basically, the process of inducing species to spawn and grow outside the wild is known as aquaculture. Although aquaculture or fish farming was practiced as early as 2000 BC in China, it was not until the early 1870's that this industry came to the United States. The aquaculture industry has exhibited significant growth, particularly over the last 20 years, and it continues to accelerate. Moreover, in the United States, aquaculture is considered one of the fastest growing segments of livestock raising.

Prior to the present invention, numerous off-shore enclosures have been proposed for the purpose of raising marine life, particularly fish. For the most part these heretofore enclosures comprise pens, cages, and netting, and the interior of the enclosure is simply a large open space.

SUMMARY OF THE INVENTION

One of the primary objects of the present invention is a marine aquaculture apparatus for raising fish species in a highly effective and economical manner.

Another object of the present invention is a marine aquaculture apparatus which is simply in design and economically feasible for practicing marine aquaculture.

Still another object of the present invention is a submersible marine aquaculture apparatus where both raising and harvesting of fish species are uniquely simple.

In accordance with the present invention, marine aquaculture apparatus comprises a submersible torus-shaped enclosure having perforations therein. Structure is provided for raising and lowering the enclosure in a body of water. An access door on the enclosure provides entry into the interior portions thereof which function as a habitat for fish.

Preferably, the torus-shaped enclosure is a perforated surface generated by the revolution of a circle about a vertical axis.

The marine aquaculture apparatus of the present invention also includes a plurality of spaced apart cables fixedly secured at one end thereof to the torus-shaped enclosure by wrapping the cable around the enclosure, for example. A centrally positioned carrier is located inside and above the torus-shaped enclosure, and the other ends of the cables are fixedly secured to the carrier.

The marine aquaculture apparatus of the present invention further includes a particular structure for raising and lowering the torus-shaped enclosure in a body of water. This structure includes a vertically oriented cable and operator means connected to move the cable up and down. The carrier is connected to the cable for movement therewith whereby the torus-shaped enclosure is raised or lowered with the raising or lowering of the carrier with the cable.

A feed delivery tube is connected between the submersible torus-shaped enclosure and the surface of the body of water in which the enclosure is submerged. The delivery tube is easily used to supply food to the marine life inside the enclosure. Specifically, a float may be connected to an upper end of the feed delivery tube for maintaining that upper end at the surface of the body of water in which the enclosure is submerged.

In a preferred embodiment of the invention the structure for raising and lowering the torus-shaped enclosure comprises a vertically oriented cable in the form of a closed continuous loop. A U-shaped tube is fixed in place at the lower end portions of the cable, and the cable extends into and through the tube. The upper end of the cable is simply wrapped around a windlass device on the service vessel to raise and lower the enclosure.

BRIEF DESCRIPTION OF THE DRAWING

Novel features and advantages of the present invention in addition to those discussed above will become apparent to persons of ordinary skill in the art from a reading of the following detailed description in conjunction with the accompanying drawings wherein similar references refer to similar parts and in which.

DETAILED DESCRIPTION OF THE INVENTION

Figure 1:
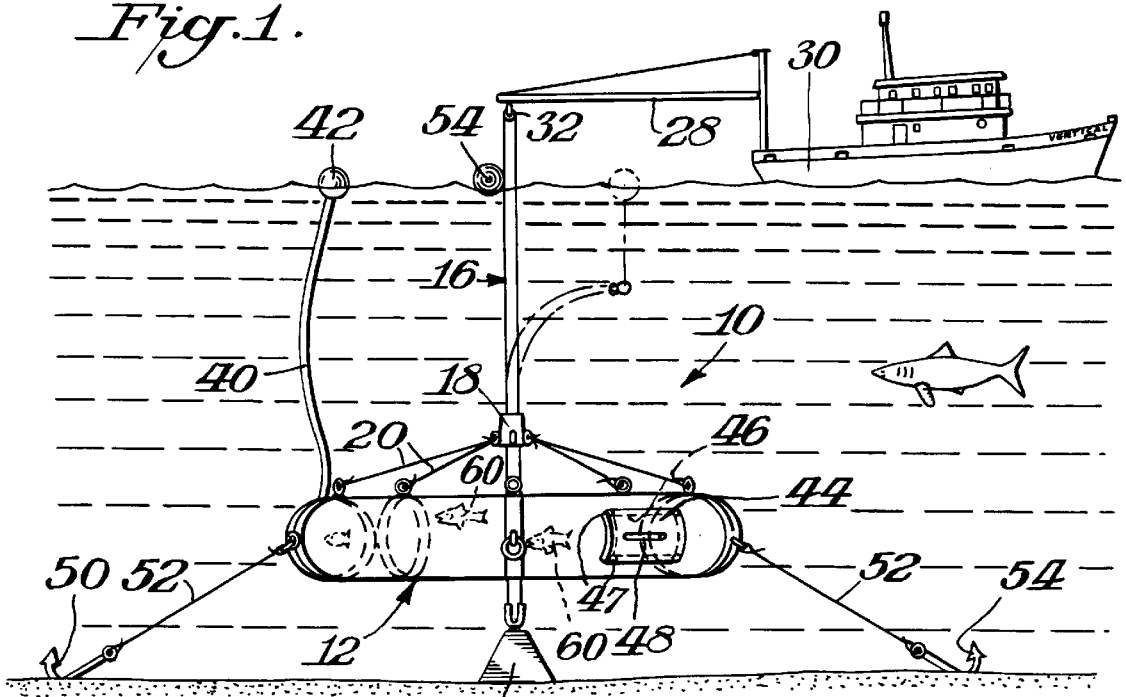
FIG. 1 is a side elevational view illustrating placement of marine aquaculture apparatus, according to the present invention.

In accordance with the present invention, a marine aquaculture apparatus 10 primarily comprises a torus-shaped enclosure 12 having perforations 14 therein. The torus-shaped enclosure may be fabricated from a number of materials including thermoplastics, for example. It is preferred that the torus-shaped enclosure comprises a perforated surface generated by the revolution of a circle about a vertical axis. The circle or cross-section of the enclosure has a diameter in the range of 2 to 10 feet and the overall diameter of the torus is in the range of 10 to 100 feet. However, the enclosure may be made as small or as large as may be required for the intended purpose of marine aquaculture.

Structure 16 is provided for raising and lowering the torus-shaped enclosure 12 in a body of water. As shown in the drawings, this structure includes a centrally positioned carrier 18 inside and above the torus-shaped enclosure. The carrier has a frusto conical shape with a hollow interior. Cables 20 are connected between the enclosure and the central carrier 18. Specifically, a plurality of cables extend between the torus-shaped enclosure and the carrier, as shown best in FIGS. 1 and 2.

Carrier 18 is connected to a motivator in the form of a continuous cable 24. The cable is anchored in place by a weight 26 that rests on the floor of the body of water into which the torus-shaped enclosure is positioned. Similarly, the upper portion of cable 24 is releasably secured to a bracket boom 28 of a tender ship 30. The cable 24 is trained around an upper windlass pulley 32 and a lower U-shaped hollow tube 34. A hoist motor 36 connected to the upper windlass pulley 32 is utilized to raise and lower the cable.

Figure 4:
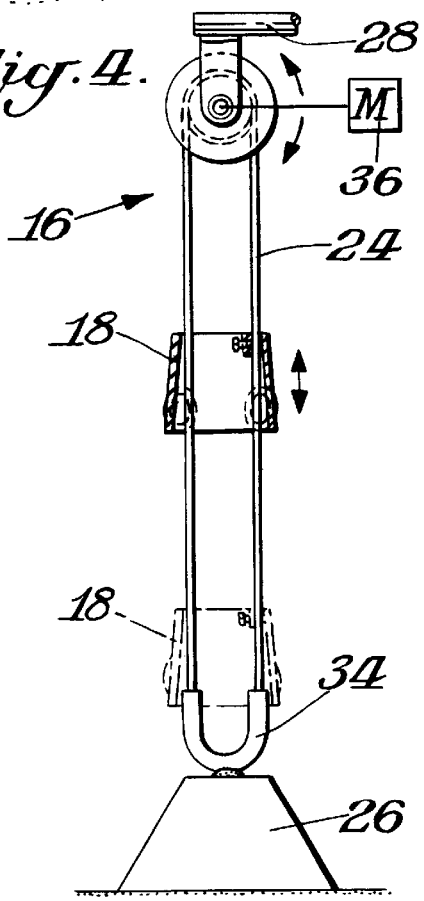
FIG. 4 is an enlarged elevational view of the mechanism for lifting and lowering the marine aquaculture apparatus, according to the present invention.
Figure 5:
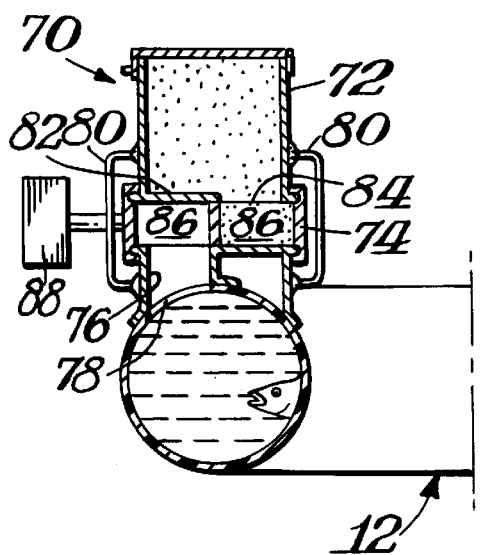
FIG. 5 is a cross-sectional view of an automated feeder, according to the present invention.
Figure 6:
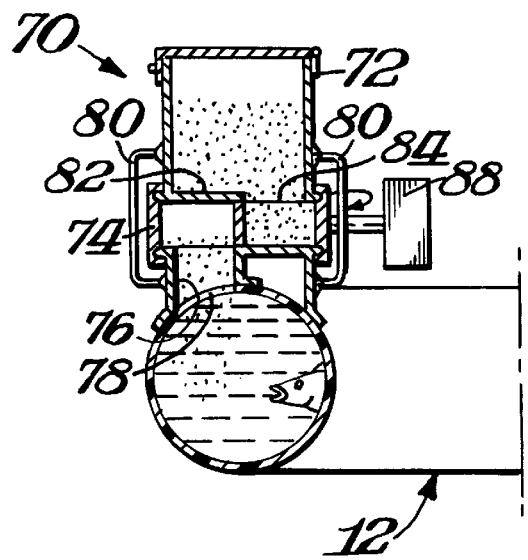
FIG. 6 is a cross-sectional view similar to FIG. 5 but illustrating a different position of the feeder.

Carrier 18 is connected to the cable for movement therewith as best shown in FIG. 4.

The marine aquaculture apparatus of the present invention also includes a feed delivery tube 40 connected between the submersible torus-shaped enclosure and the surface of the body of water in which the enclosure is submerged. A float 42 is connected at the upper end of the feed delivery tube in order to maintain that end at the water surface. Marine life in the enclosure, such as fish and the like, are easily fed from the water surface utilizing the feed delivery tube.

Figure 2:
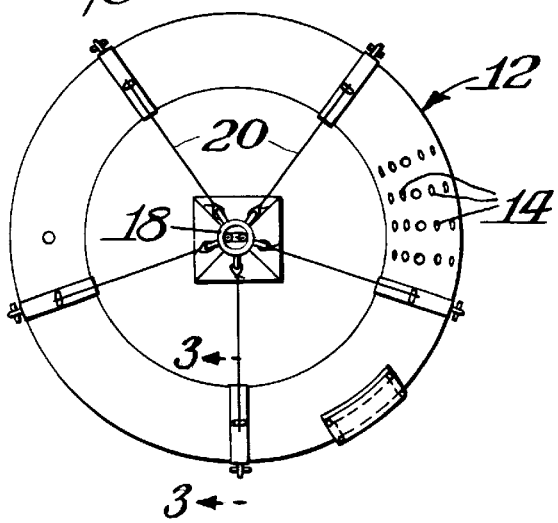
FIG. 2 is a top plan view of the marine aquaculture apparatus shown in FIG. 1, according to the present invention.
Figure 3:
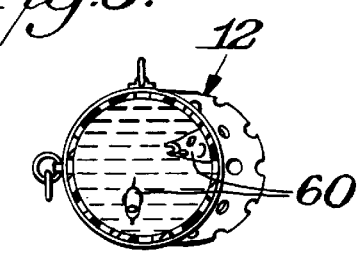
FIG. 3 is an enlarged cross-sectional elevational view taken along line 3—3 of FIG. 2.

The torus-shaped enclosure 12 includes an access door 44 for providing entry into interior portions of the enclosure. The access door 44 shown in FIG. 1 is simply a curved section placed over a cutout access opening 46 in the enclosure. The door is releasably attached to the enclosure by four lock pins 47, and a handle 48 is used to remove and to close the access door.

In operation, the torus-shaped enclosure is easily supplied with marine life at the surface of the body of water in which it is to be submerged. Access door 44 is useful for that purpose. With the structure 16 in place for raising and lowering the torus-shaped enclosure, the enclosure is simply lowered by manipulation of cable 24 and hoist motor 36. As the cable is lowered the carrier 18 moves with the cable to a desired position over the U-shaped hollow tube 34. Anchors 50 may also be utilized to stabilize the torus-shaped enclosure in its submerged position. Cables 52 connect the anchors 50 to the enclosure.

A marker buoy 54 at the surface of the body of water into which the enclosure is submerged is located on the water surface. The marker buoy also functions to securely maintain the upper end of the cable 24 when the tender ship 30 is away from the location.

The shape of the enclosure 12 is considered unique in raising marine life, such as fish 60. The fish simply swim in circles within the enclosure and this provides a unique habitat with very little or no awareness of the enclosure.

An automatic feeder 70 may also be used in combination with the torus-shaped enclosure. Feeder 70 includes a fixed supply bin 72 for holding the fish food in a dry condition, an intermediate rotatable section 74, and a fixed passageway 76 communicating with an access opening 78 in the enclosure. The supply bin and the passageway are connected together by connectors 80. The passageway 76 is fixed to the enclosure and in turn the passageway is fixed to the supply bin 72 by the connector 80.

The supply bin 72 includes a closed bottom wall portion 82 and an opening 84. The opening 84 communicates with one of two open ended compartments 86 in the intermediate rotatable section 74. Upon 180° rotation of section 74, one or the other compartment 86 is aligned with passageway 76.

A vane 88 connected to intermediate section 74 is used to rotate that section upon changes in the direction of water currents usually associated with tidal changes.

In operation, one of the compartments 86 of section 74 is in communication with the bottom opening 84 of the supply bin, and that compartment fills with food. When the vane 88 causes the section 74 to rotate, the filled compartment is positioned over passageway 76 and the food drops into the enclosure. Simultaneously, the other open ended compartment of section 74 is filled with food. The next directional change of current then causes the vane to rotate the intermediate section and thereby position the then filled compartment 86 over the open passageway 76. The food simply drops into the enclosure, and the procedure is repeated. Connectors 80 also function as stops for the vane.

I claim:

1. Marine aquaculture apparatus comprising a submersible torus-shaped rigid enclosure having perforations therein, means for raising and lowering the torus-shaped enclosure in a body of water, an access door on the torus-shaped enclosure for providing entry into interior portions thereof, and the torus-shaped rigid enclosure having an uninterrupted interior defining a continuous torus-shaped path for marine life within the enclosure.

2. Marine aquaculture apparatus as in claim 1 wherein the torus-shaped enclosure is a perforated surface generated by the revolution of a circle about a vertical axis.

3. Marine aquaculture apparatus as in claim 1 including a plurality of spaced apart cables fixedly secured at one end thereof to the torus-shaped enclosure, a centrally positioned carrier inside and above the torus-shaped enclosure, and wherein each cable is fixedly secured to the carrier at an end thereof opposite the end connected to the torus-shaped enclosure.

4. Marine aquaculture apparatus as in claim 1 including a feed delivery tube connected between the submersible torus-shaped enclosure and the surface of the body of water in which the enclosure is submerged.

5. Marine aquaculture apparatus as in claim 4 including a float connected to an upper end of the feed delivery tube for maintaining that upper end at the surface of the body of water in which the enclosure is submerged.

6. Marine aquaculture apparatus as in claim 1 in combination with an automatic food feeder for supplying the enclosure with food.

7. Marine aquaculture apparatus comprising a submergible torus-shaped enclosure having perforations therein, means for raising and lowering the torus-shaped enclosure in a body of water, an access door on the torus-shaped enclosure for providing entry into the interior thereof, a plurality of spaced apart cables fixedly secured at one end thereof to the torus-shaped enclosure, a centrally positioned carrier inside and above the torus-shaped enclosure, and wherein each cable is fixedly secured to the carrier at an end thereof opposite the end connected to the torus-shaped enclosure, and wherein the means for raising and lowering the torus-shaped enclosure in a body of water includes a vertically oriented cable, operator means connected to raise and lower the vertically oriented cable, and wherein the carrier is connected to the vertically oriented cable for movement therewith whereby the torus-shaped enclosure is raised or lowered with the raising and lowering of the carrier with the vertically oriented cable.

8. Marine aquaculture apparatus comprising a submergible torus-shaped enclosure having perforations therein, means for raising and lowering the torus-shaped enclosure in a body of water, an access door on the torus-shaped enclosure for providing entry into the interior thereof, and wherein the means for raising and lowering the torus-shaped enclosure in a body of water includes a vertically oriented continuous cable having upper and lower end portions, a weight connected to the lower end portion of the cable to thereby anchor the cable in place, and a float connected to the upper end portion of the cable.

9. Marine aquaculture apparatus as in claim 8 including a lower U-shaped hollow tube through which the cable extends.

10. Marine aquaculture apparatus as in claim 9 including a centrally positioned carrier inside and above the torus-shaped enclosure, cable means connecting the enclosure to the carrier, and means connecting the carrier to the vertically oriented continuous cable for movement therewith.

11. Marine aquaculture apparatus as in claim 10 wherein the cable means comprises a plurality of spaced apart cables fixedly secured at one end thereof to the torus-shaped enclosure and fixedly secured to the carrier at the other end of each cable opposite to the end connected to the torus-shaped enclosure.

* * * * *